US012110807B1

(12) United States Patent
Bitter et al.

(10) Patent No.: US 12,110,807 B1
(45) Date of Patent: Oct. 8, 2024

(54) ALTERING STRUCTURAL RESPONSE OF TWO-PIECE HOLLOW-VANE ASSEMBLY BY CHANGING THE COVER COMPOSITION

(71) Applicant: Raytheon Technologies Corporation, Farmington, CT (US)

(72) Inventors: David E. Bitter, Chester, CT (US); S Bret Bonarrigo, Wallingford, CT (US); William John Oldach, West Hartford, CT (US); William C. Sheridan, East Haddam, CT (US); Matthew Michael Massaro, Wilmington, DE (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/121,146

(22) Filed: Mar. 14, 2023

(51) Int. Cl.
*F01D 5/18* (2006.01)

(52) U.S. Cl.
CPC .......... *F01D 5/18* (2013.01); *F05D 2230/237* (2013.01)

(58) Field of Classification Search
CPC . B32B 37/18; B32B 38/0004; B32B 2603/00; F01D 5/18; F01D 5/147; F01D 5/282; F04D 19/002; F04D 29/324; F05D 2230/237; F05D 2220/36; F05D 2300/603; Y02T 50/60; Y10T 156/1052
See application file for complete search history.

(56) References Cited

U.S. PATENT DOCUMENTS

| 9,957,972 | B2 | 5/2018 | Foster | |
|---|---|---|---|---|
| 10,823,190 | B2 | 11/2020 | Weisse et al. | |
| 11,346,228 | B1* | 5/2022 | Burdette | .............. D03D 1/00 |
| 11,415,013 | B1* | 8/2022 | Whittle | .............. F01D 9/041 |
| 2015/0198173 | A1* | 7/2015 | Weisse | ............. B32B 37/18 |
| | | | | 416/229 R |
| 2016/0024943 | A1 | 1/2016 | Hyatt | |
| 2016/0333710 | A1 | 11/2016 | Klinetob et al. | |
| 2017/0023008 | A1 | 1/2017 | Roche | |
| 2018/0179906 | A1* | 6/2018 | Schetzel | ............. F01D 9/041 |
| 2018/0363475 | A1* | 12/2018 | de Diego | ............. C04B 35/71 |
| 2019/0078452 | A1 | 3/2019 | Zaccardi et al. | |
| 2019/0112931 | A1 | 4/2019 | Malmborg et al. | |
| 2019/0186293 | A1 | 6/2019 | Boutaleb et al. | |
| 2020/0182086 | A1 | 6/2020 | Marquie et al. | |

FOREIGN PATENT DOCUMENTS

FR 3109962 A1 11/2021

OTHER PUBLICATIONS

Extended European Search Report mailed Apr. 29, 2024 for counterpart European Application No. 2416270.

\* cited by examiner

*Primary Examiner* — Dapinder Singh
(74) *Attorney, Agent, or Firm* — Bachman & LaPointe, P.C.

(57) ABSTRACT

A hollow vane assembly including an open body including an interior; at least one cover support structure formed in said open body proximate the interior; a cover brazed to the open body to form at least one flow passage; and at least one ply formed in the cover.

20 Claims, 4 Drawing Sheets

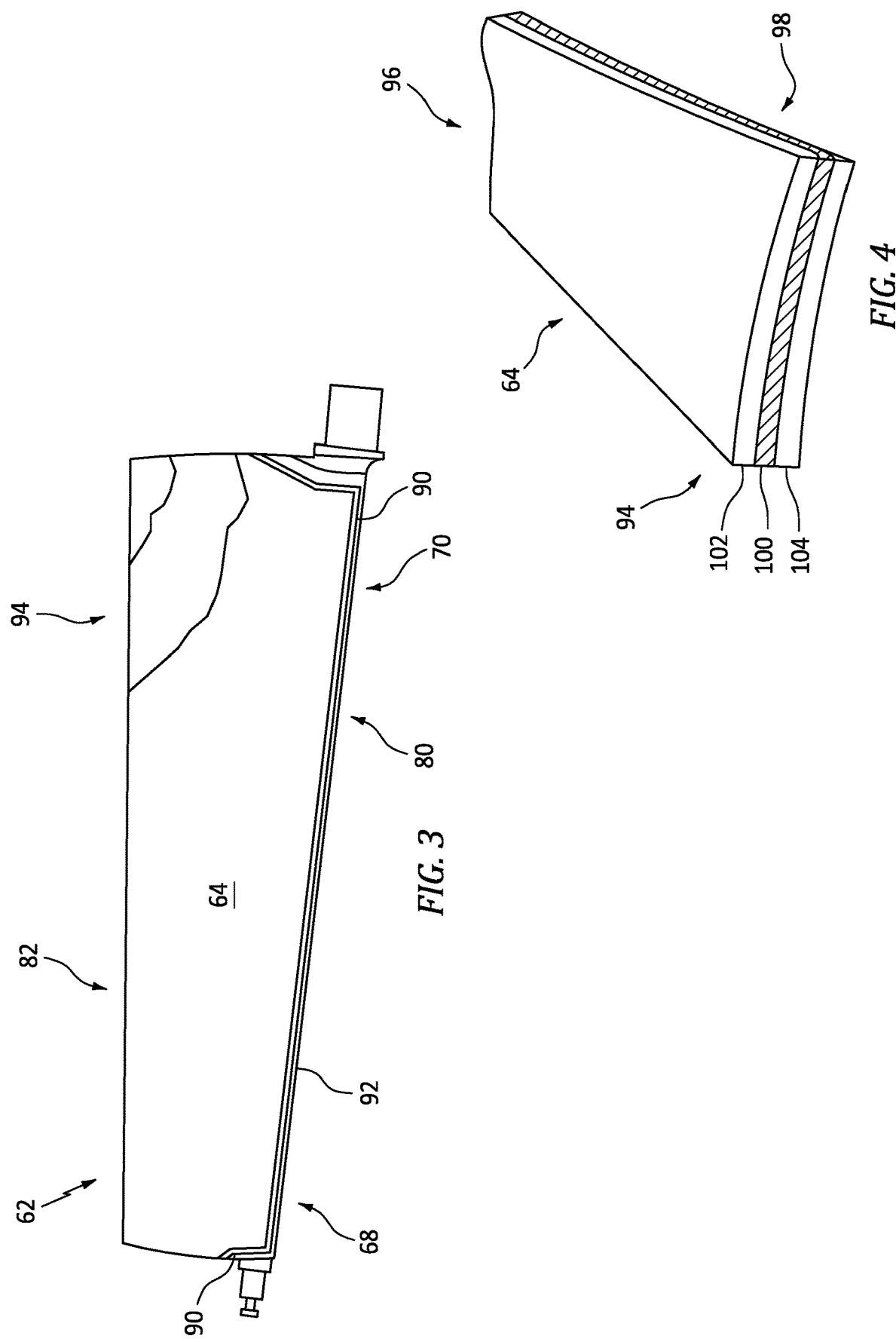

ALTERING STRUCTURAL RESPONSE OF TWO-PIECE HOLLOW-VANE ASSEMBLY BY CHANGING THE COVER COMPOSITION

BACKGROUND

The present disclosure is directed to a hollow vane with an open body and a cover with altered composition to modify the structural response of the vane.

Hollow vanes are typically utilized to enable air, either hot or cold, to flow through the part to achieve a desired thermal effect. Historically, hollow vanes have been manufactured by casting the external airfoil shape with cores located internally within the mold. This method results in a hollow cavity within the cast part, however, castings, from both a process capability and supplier willingness perspectives, are not capable of meeting the dimensional and material requirements as demanded by the engine operating environment.

What is needed is a vane cover that can be modified to adapt the vibratory characteristics of the vane for a predetermined operating service.

SUMMARY

In accordance with the present disclosure, there is provided a process of tailoring vibratory characteristics of a cover for an open body hollow vane assembly comprising forming the open body, the open body including an interior; forming at least one cover support structure in said open body proximate the interior; forming a cover, the cover being configured to attach to the open body to form at least one flow passage; forming at least one ply in the cover; and brazing the cover to the open body.

A further embodiment of any of the foregoing embodiments may additionally and/or alternatively include the process further comprising forming the at least one ply integral with the surface of the cover.

A further embodiment of any of the foregoing embodiments may additionally and/or alternatively include the process further comprising disposing a dampener material between an outer layer and an inner layer of the cover to form the at least one ply in the cover.

A further embodiment of any of the foregoing embodiments may additionally and/or alternatively include the process further comprising forming an airfoil from the combination of the open body brazed together with the cover.

A further embodiment of any of the foregoing embodiments may additionally and/or alternatively include the process further comprising forming a dual walled structure having contoured surfaces including the at least ply formed by additive and/or subtractive processes.

A further embodiment of any of the foregoing embodiments may additionally and/or alternatively include the process further comprising modifying a vibratory characteristic of the cover with the at least one ply.

A further embodiment of any of the foregoing embodiments may additionally and/or alternatively include the process further comprising changing a modal shape of the cover to enhance the stiffness of the cover locally responsive to aerodynamic forces created by a working fluid flowing over the hollow vane assembly.

In accordance with the present disclosure, there is provided a hollow vane assembly comprising an open body including an interior; at least one cover support structure formed in said open body proximate the interior; a cover brazed to the open body to form at least one flow passage; and at least one ply formed in the cover.

A further embodiment of any of the foregoing embodiments may additionally and/or alternatively include the at least one ply includes a dampener material between an outer layer and an inner layer of the cover.

A further embodiment of any of the foregoing embodiments may additionally and/or alternatively include the at least one ply includes material attached to the surface of the cover.

A further embodiment of any of the foregoing embodiments may additionally and/or alternatively include a dual walled structure having contoured surfaces and the at least one ply is formed by the open body together with the cover.

A further embodiment of any of the foregoing embodiments may additionally and/or alternatively include the at least one ply is configured to modify a vibratory characteristic of the cover.

A further embodiment of any of the foregoing embodiments may additionally and/or alternatively include the at least one ply includes layers of material that are distributed across the surface of the cover.

A further embodiment of any of the foregoing embodiments may additionally and/or alternatively include the at least one ply is formed by layering material on the surface of the cover.

In accordance with the present disclosure, there is provided a process for modifying a vibratory characteristic of a cover to an open body comprising forming an open body, the open body includes a leading edge opposite a trailing edge, the open body includes a pressure side and suction side opposite the pressure side, the open body including an interior; forming a cover, the cover being configured to couple with the open body proximate the pressure side to form at least one flow passage; forming at least one ply in the cover; and attaching the cover to the open body.

A further embodiment of any of the foregoing embodiments may additionally and/or alternatively include the process further comprises layering a dampener material between an outer layer and an inner layer of the cover.

A further embodiment of any of the foregoing embodiments may additionally and/or alternatively include the process further comprising modifying a vibratory characteristic of the cover with the at least one ply formed in the cover.

A further embodiment of any of the foregoing embodiments may additionally and/or alternatively include the process further comprising changing a modal shape of the cover to enhance the stiffness of the cover locally responsive to aerodynamic forces created by a working fluid flowing over the hollow vane assembly.

A further embodiment of any of the foregoing embodiments may additionally and/or alternatively include the process further comprising forming a dual walled structure having contoured surfaces including the at least one ply formed by additive and/or subtractive processes.

A further embodiment of any of the foregoing embodiments may additionally and/or alternatively include the process further comprising forming an airfoil from the combination of the open body together with the cover having the at least one ply, the airfoil being responsive to the at least one ply.

A further embodiment of any of the foregoing embodiments may additionally and/or alternatively include the process further comprising adding layers of mass at a predetermined location on the surface of the cover.

Other details of the hollow vane assembly are set forth in the following detailed description and the accompanying drawings wherein like reference numerals depict like elements.

BRIEF DESCRIPTION OF THE DRAWINGS

FIG. 3 is a schematic representation of an exemplary vane body.

FIG. 4 is a schematic representation of an exemplary cover.

DETAILED DESCRIPTION

Figure 1:
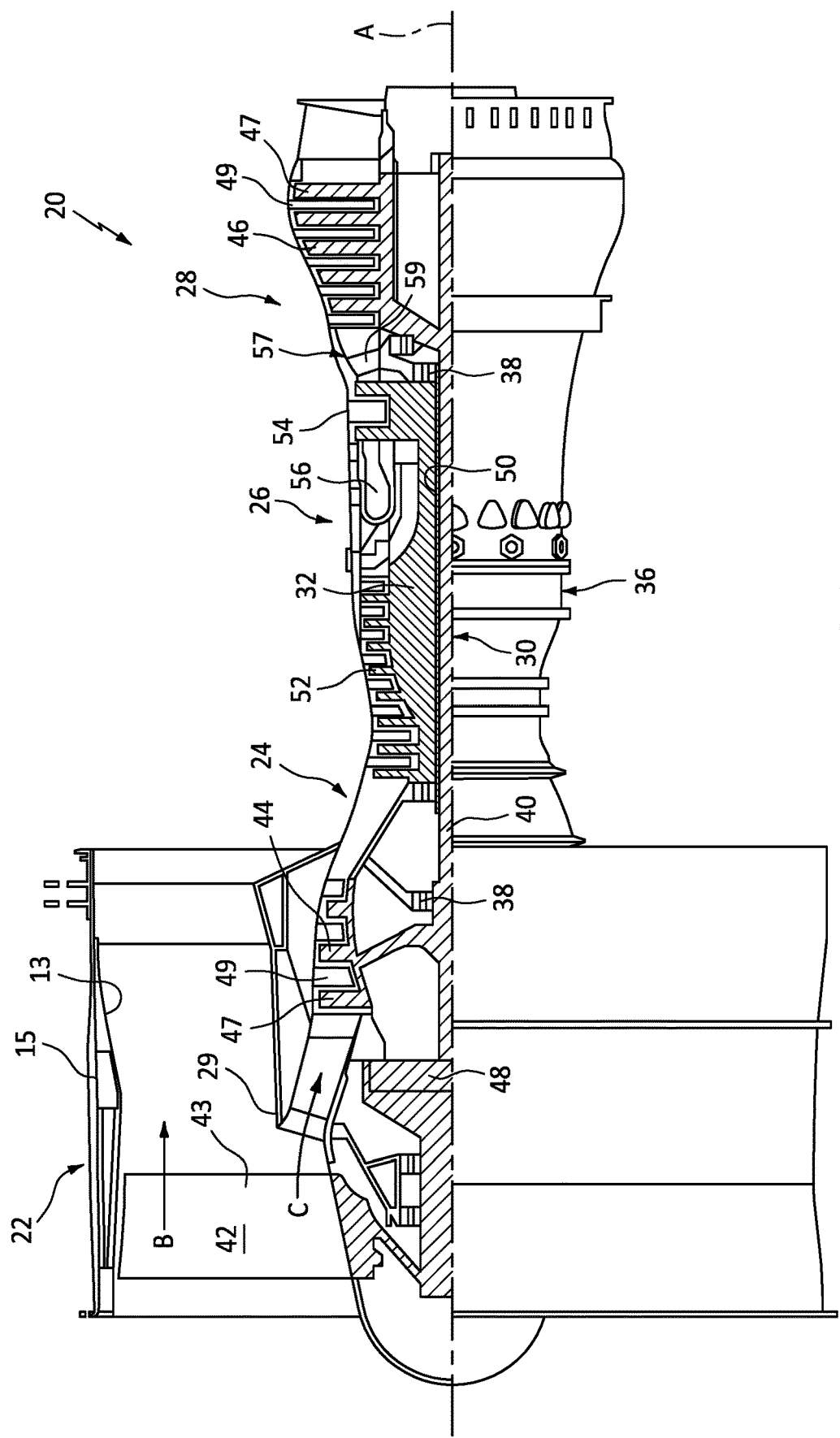
FIG. 1 is a cross section view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of pounds-mass per hour lbm/hr of fuel flow rate being burned divided by pounds-force lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "Low corrected fan tip speed" is the actual fan tip speed in ft/sec divided by an industry standard temperature correction of $[(\text{Tram}\,°\text{R})/(518.7°\,\text{R})]^{0.5}$. The "low corrected fan tip speed" can be less than or equal to 1150.0 ft/second (350.5 meters/second), and greater than or equal to 1000.0 ft/second (304.8 meters/second).

Figure 2:
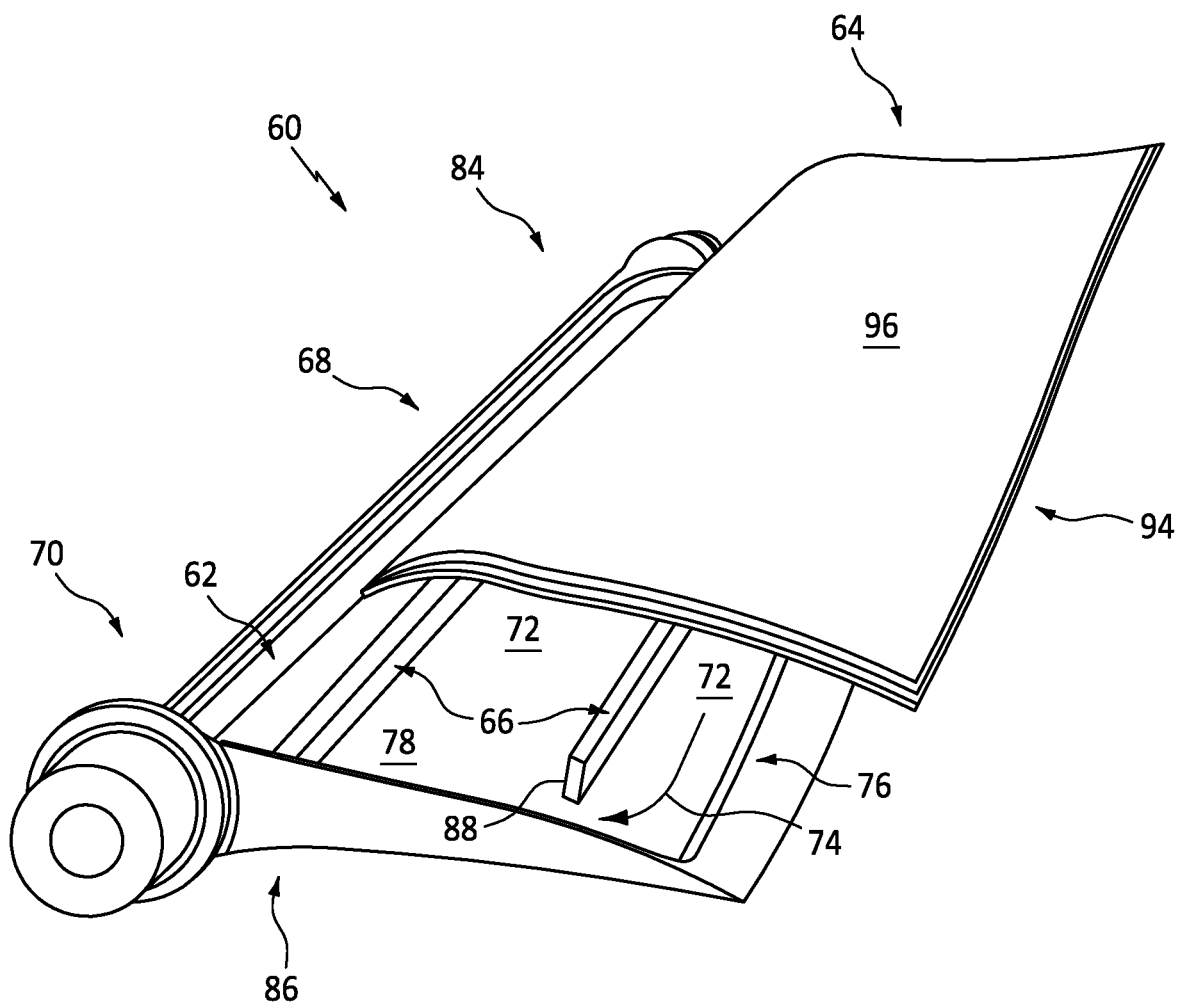
FIG. 2 is a schematic representation of an exemplary vane assembly.

Referring also to FIG. 2 shows an exemplary two piece hollow-vane assembly 60. The hollow-vane assembly 60 includes an open body 62 that can be a single piece design, being completely integral or monolithic. The two piece hollow-vane assembly 60 includes a cover 64 that is attachable to the open body 62. The open body 62 includes cover support structure(s) 66. The open body 62 and cover 64 are combined to form an airfoil 68 of a vane 70 when brazed together. It is contemplated that the hollow-vane assembly 60 can also be configured as other dual walled structures having contoured surfaces, such as a turbine blade. The hollow-vane assembly 60 can include a three dimensionally contoured shape. The three dimensional contoured surface can refer to a surface defined by an X, Y, and Z axis. The three dimensional contoured surface can vary from point to point to include surface variation of X, Y and Z coordinates.

The vane assembly 60 is shown with representative fluid flow passages 72 with flow arrow 74. The flow arrow 74 shows an exemplary cooling/heating fluid 76 flow through the fluid flow passages 72 at the interior 78 formed by the open body 62 and cover 64. The flow passages 72 can be configured as multiple cooling channels 72 that allow for cooling fluid 76 to flow through the interior 78.

The open body 62 and cover 64 can be constructed from rigid materials, such as a metal alloy and in alternative embodiments, from heat resistant super alloy composition, nickel-based, or cobalt based compositions. The open body 62 and cover 64 can be made of the same material or different materials.

Referring also to FIG. 3, vane assembly 60 is shown. The open body 62 can be formed from a casting, for example. The open body 62 can include a leading edge 80 opposite a trailing edge 82, a pressure side 86 and suction side 84 opposite the pressure side 86 (FIG. 2). The open body 62 including the cover support structures 66 allow for the formation of the flow passages 72. The cover support structure 66 can form an interior wall 88. The cover support structure 66 can be raised surface features of the open body 62. The cover support structure 66 can extend from the open body 62 distally.

The cover support structure 66 can form parts of the flow passages 72 along with the cover 64 and open body 62. The open body 62 with integral cover support structure(s) 66 can be manufactured via a manufacturing process that supports the geometric and material capability needs of the vane 60. Potential manufacturing options for the open body 62 can include casting, additive manufacturing, or conventional machining.

Once the open body 62 is manufactured all surfaces of the vane 60, including the now exposed interior 78 of the open body 62, can be post processed to achieve the desired metallurgical properties.

In parallel to the manufacturing of the open body 62, the cover 64 can be fabricated. In addition to the manufacturing options available for the open body 62 the cover 64 can be formed to the desired geometry via conventional metal forming methods like stamping, deep drawing, or hydroforming, and machining via multi-axis CNC.

The cover 64 can be attached to the open body 62 via a variety of techniques, such as laser welding or brazing with structural brazing joints 90. The geometry of the structural brazing joints 90 is dictated by the location along the vane assembly 60. For example, shown in FIG. 3, the brazing joint 90 is located proximate the leading edge 80. The leading edge 80 can include a non-structural seam 92 that can be filled and polished flush for aero considerations.

Referring also to FIG. 4, the cover 64 can include layers or plies, at least one ply 94 as shown in FIGS. 2, 3 and 4. The plies 94 can be formed at a variety of locations and sizes and can be integral with the cover 64. The plies 94 can be material added/attached to an outer surface 96 or inner surface 98 of the cover 64. The plies 94 can be placed along a variety of locations across the surfaces 96, 98.

In an exemplary embodiment, the plies 94 can include a dampener material 100 that can be employed in the plies 94. As seen in FIG. 4 the dampener material 100 is located between an outer layer 102 and inner layer 104. In an exemplary embodiment, the dampener 100 can be an elastomer material between two metal layers 102, 104. The dampener material 100 can be coated having a thickness T. The thickness T can range from about 10 mils to about 50 mils (thousandth of an inch). In an exemplary embodiment the thickness T of the coating can be tailored to be a predetermined thickness of 50 mils depending on the specific frequency range that is targeted to be dampened. The predetermined thickness provides a technical advantage because it can provide more damping without compromising the structural integrity of the vane.

The dampener material 100 can be a viscoelastic material, a super-elastic memory alloy and combinations thereof. The viscoelastic material can exhibit both elastic and viscous behavior when deformed. There are three main characteristics of viscoelastic materials, creep, stress relaxation, and hysteresis. The creep phenomenon is used to describe the continued deformation of a viscoelastic material after the load has reached a constant state. A superelastic alloy can belong to the larger family of shape-memory alloys. When mechanically loaded, a superelastic alloy deforms reversibly to very high strains (up to 10%) by the creation of a stress-induced phase. When the load is removed, the new phase becomes unstable and the material regains its original shape.

In this embodiment, the inner layer 104 can be brazed to the open body 62 first, with Braze temperatures at about 1800 Fahrenheit. Then, the dampener material 100 (not capable of 1800 F) and the outer layer 102 can be bonded in place. A final perimeter laser weld can secure the outer layer 102 to the open body 62.

The plies 94 can alter the structural response and redistribute the stress on the cover 64. Redistribution of the stress on the cover 64 can enhance the durability of the vane assembly 60 and prolong the life of the brazing joint 90.

The plies 94 are configured to modify the vibratory characteristics of the cover 64. The plies 94 are configured to change the modal shapes of the cover 64 to enhance the stiffness of the cover 64 locally responsive to aerodynamic forces created by the working fluid flowing over the vane assembly 60.

The plies 94 can provide the means to alter the airfoil 68 stiffness and tailor to the vibratory characteristics of the airfoil 68 in different applications. The capacity to tailor the vibratory characteristics can allow the same engine module or components to be modified and re-used in different applications. For example, taking an engine designed for certain cruise speeds and modifying the plies 94 for use at other cruise speeds or from a steady flight to a more variable flight pattern (cruise versus repeated take-off/land). Engines that spend significant time at cruise are subjected to longer term, consistent vibrations or constant levels of vibration. By comparison, engines experience higher spikes in vibration during take-off and landing. By tailoring the airfoil 68 to the intended purpose of the engine, one can optimize the airfoil 68 for these constant vibrations at cruise or frequent spikes during take-off/land. This will allow one to optimize part life based on material fatigue.

Similarly to the open body 62, post processing of all part surfaces may be performed on the cover 64 to achieve the desired metallurgical properties.

With both the open body 62 and cover 64 fabrication completed the cover 64 can be permanently joined to the open body 62 via brazing. Any subsequent heat treatment, final finishing, inspections, etc. can follow the brazing.

Figure 5:
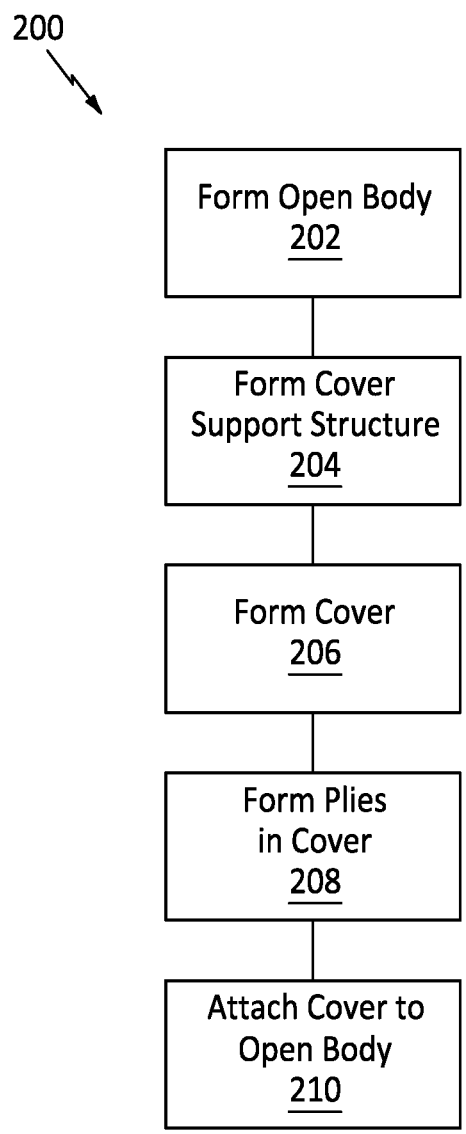
FIG. 5 is an exemplary process map.

Referring also to FIG. 5 a process map showing the process 200. The process 200 can include the step 202 of forming the open body 62. The next step 204 can include forming the cover support structure 66 in the open body 62. The next step 206 can include forming the cover 64. The next step 208 can include forming the plies 94 in the cover 64. The next step 210 can include brazing the cover 64 to the open body 62. The cover support structure 66 can be coupled to the cover 64 by brazing.

A technical advantage of the disclosed hollow vane assembly includes the selection of a manufacturing method that meets the geometric requirements of the hardware while reducing the metallurgical shortfalls imposed by when casting hollow vanes.

Another technical advantage of the disclosed hollow vane assembly includes direct machining access within the internal passageways of the vane.

Another technical advantage of the disclosed hollow vane assembly includes capacity to optimize the geometry for strength/weight.

Another technical advantage of the disclosed hollow vane assembly includes capacity to alter the exterior structure of the cover.

Another technical advantage of the disclosed hollow vane assembly includes capacity to modify the modal response of the airfoil by use of plies.

Another technical advantage of the disclosed hollow vane assembly includes the capacity to modify the structural behavior of the airfoil at different operating points of the engine.

Another technical advantage of the disclosed hollow vane assembly includes the capacity to optimize the airfoil structure for stresses at different engine operating points.

Another technical advantage of the disclosed hollow vane assembly includes the capacity to alter the stiffness of the airfoil.

Another technical advantage of the disclosed hollow vane assembly includes the optimization of the airfoil by use of the plies for predetermined modal shapes and stresses at different engine operating points.

Another technical advantage of the disclosed hollow vane assembly includes tailoring the airfoils of the engine for different uses.

Another technical advantage of the disclosed hollow vane assembly includes tailoring the airfoils of the engine for different air-frame applications.

There has been provided a hollow vane assembly. While the hollow vane assembly has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process of tailoring vibratory characteristics of a cover for an open body hollow vane assembly comprising:
    forming the open body, the open body including an interior;
    forming at least one cover support structure in said open body proximate the interior;
    forming a cover, the cover being configured to attach to the open body to form at least one flow passage;
    forming at least one ply in the cover;
    disposing a dampener material between an outer layer and an inner layer of the cover to form the at least one ply in the cover; and
    brazing the cover to the open body.

2. The process according to claim 1, further comprising:
    forming the at least one ply integral with the surface of the cover.

3. The process according to claim 1,
    wherein the dampener material includes an elastomer material between an outer metal layer and an inner metal layer.

4. The process according to claim 1, further comprising:
    forming an airfoil from the combination of the open body brazed together with the cover;
    wherein the dampener material comprises at least one of a viscoelastic material, a super-elastic memory alloy and combinations thereof.

5. The process according to claim 1, further comprising:
    forming a dual walled structure having contoured surfaces including the at least ply formed by additive and/or subtractive processes.

6. The process according to claim 1, further comprising:
    modifying a vibratory characteristic of the cover with the at least one ply.

7. The process according to claim 1, further comprising:
    changing a modal shape of the cover to enhance the stiffness of the cover locally responsive to aerodynamic forces created by a working fluid flowing over the hollow vane assembly.

8. A hollow vane assembly comprising:
    an open body including an interior;
    at least one cover support structure formed in said open body proximate the interior;

a cover brazed to the open body to form at least one flow passage; and at least one ply formed in the cover, wherein the at least one ply includes a dampener material between an outer layer and an inner layer of the cover.

9. The hollow vane assembly according to claim 8, wherein the dampener material comprises a thickness in a range from 10 mils to 50 mils.

10. The hollow vane assembly according to claim 9, wherein a dual walled structure having contoured surfaces and the at least one ply is formed by the open body together with the cover.

11. The hollow vane assembly according to claim 8, wherein the at least one ply includes material attached to the surface of the cover.

12. The hollow vane assembly according to claim 8, wherein the at least one ply is configured to modify a vibratory characteristic of the cover.

13. The hollow vane assembly according to claim 8, wherein the at least one ply includes layers of material that are distributed across the surface of the cover.

14. The hollow vane assembly according to claim 8, wherein the at least one ply is formed by layering material on the surface of the cover.

15. A process for modifying a vibratory characteristic of a cover to an open body comprising:

forming an open body, the open body includes a leading edge opposite a trailing edge, the open body includes a pressure side and suction side opposite the pressure side, the open body including an interior;

forming a cover, the cover being configured to couple with the open body proximate the pressure side to form at least one flow passage;

forming at least one ply in the cover;

layering a dampener material between an outer layer and an inner layer of the cover; and attaching the cover to the open body.

16. The process of claim 15, wherein the dampener material is formed from an elastomer material between the outer layer and the inner layer of the cover, wherein the outer layer and the inner layer are metal.

17. The process of claim 15, further comprising:

modifying a vibratory characteristic of the cover with the at least one ply formed in the cover.

18. The process of claim 15, further comprising:

changing a modal shape of the cover to enhance the stiffness of the cover locally responsive to aerodynamic forces created by a working fluid flowing over the hollow vane assembly.

19. The process of claim 15, further comprising:

forming an airfoil from the combination of the open body together with the cover having the at least one ply, the airfoil being responsive to the at least one ply.

20. The process of claim 15, further comprising:

adding layers of mass at a predetermined location on the surface of the cover.

* * * * *